United States Patent
Eriksson

(10) Patent No.: US 8,346,850 B2
(45) Date of Patent: Jan. 1, 2013

(54) METHOD AND APPARATUS FOR ESTABLISHING A SESSION

(75) Inventor: Anders Eriksson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

(21) Appl. No.: 12/519,550

(22) PCT Filed: Dec. 18, 2006

(86) PCT No.: PCT/EP2006/069866
§ 371 (c)(1),
(2), (4) Date: Nov. 24, 2009

(87) PCT Pub. No.: WO2008/074365
PCT Pub. Date: Jun. 26, 2008

(65) Prior Publication Data
US 2010/0077023 A1    Mar. 25, 2010

(51) Int. Cl.
*G06F 15/16* (2006.01)
(52) U.S. Cl. .................. 709/203; 709/219; 370/260
(58) Field of Classification Search .................. 709/203, 709/219; 370/260
See application file for complete search history.

(56) References Cited

U.S. PATENT DOCUMENTS

| | | | |
|---|---|---|---|
| 2003/0126486 A1 | 7/2003 | Bui | |
| 2004/0047365 A1* | 3/2004 | Williams et al. | 370/465 |
| 2005/0066038 A1* | 3/2005 | Sakamoto et al. | 709/227 |
| 2005/0070778 A1* | 3/2005 | Lackey et al. | 600/366 |
| 2005/0120138 A1 | 6/2005 | Carmello et al. | |
| 2006/0159048 A1* | 7/2006 | Han et al. | 370/331 |
| 2006/0174009 A1* | 8/2006 | Martiquet et al. | 709/227 |
| 2007/0043829 A1* | 2/2007 | Dua | 709/219 |
| 2007/0162744 A1* | 7/2007 | Hoshino et al. | 713/156 |
| 2007/0286100 A1* | 12/2007 | Saaranen et al. | 370/260 |
| 2008/0263170 A1* | 10/2008 | Caron et al. | 709/207 |
| 2009/0037587 A1* | 2/2009 | Yoshimi et al. | 709/227 |
| 2009/0089426 A1* | 4/2009 | Yamasaki et al. | 709/225 |
| 2009/0254658 A1* | 10/2009 | Kamikura et al. | 709/225 |
| 2010/0228978 A1* | 9/2010 | Kudo | 713/168 |

FOREIGN PATENT DOCUMENTS

| | | |
|---|---|---|
| DE | 100 26 631 A1 | 1/2002 |
| WO | WO 03/039103 A | 5/2003 |
| WO | WO 02/003724 A | 7/2003 |

* cited by examiner

Primary Examiner — Tesfay Yohannes

(57) ABSTRACT

A method and Domain Name System (DNS) server for establishing a communication session in an Internet Protocol (IP)-based communication network. The DNS server receives a query containing a DNS name of a destination terminal as a search key, and determines whether an IP address for the DNS name is registered with the DNS server. If so, the DNS server returns the registered IP address to the sender of the query. If not, the DNS server sends a wake-up message to the destination terminal which, in response, establishes an IP data session with the communication network. The DNS server then receives an IP address for the destination terminal from an access server or from a Dynamic Host Control Protocol (DHCP) server, and returns the received IP address to the sender of the query.

12 Claims, 5 Drawing Sheets

METHOD AND APPARATUS FOR ESTABLISHING A SESSION

TECHNICAL FIELD

The present invention relates to a method and apparatus for establishing a session in a communication system. The invention is applicable in particular, though not necessarily, to the establishment of a session for transporting IP data to a wireless terminal.

BACKGROUND

The use of wireless terminals to access the Internet is growing dramatically. This is due to a large extent to the availability of high speed access technologies such as GPRS specified for 2G (GSM) and 3G (UMTS) networks, as well of course to the availability of high quality content. In the case of GPRS sessions (known as PDP contexts), although users tend to be billed based upon sent and received data volumes rather than time, these cannot be considered "always-on". Rather, a user must initiate a session from his or her terminal, and the session will remain on until some condition is met (typically until either the user terminates the session or some predefined period of non-use has elapsed in which case the terminal or network can end the session). One reason for this approach is that terminals are allocated IP addresses for use in routing traffic to the terminals, and as IP address space is limited (according to IPv4), an access network must recover unused addresses for allocation to newly arriving terminals. Another reason is that active sessions consume resources at network nodes (and at the terminal) and it is desirable to keep the number of active sessions to a minimum at any one time.

Current and future service delivery to wireless terminals will rely upon peer entities or networks having knowledge of useable IP addresses for destination wireless terminals. Consider for example an email sent by a sending entity using the SMTP protocol. The email will be routed to a node within the recipient's home domain on the basis of the domain name part of the email address. It is then necessary for the home domain to resolve the recipient's email address into an IP address. However, in the case that the destination terminal does not have an ongoing data (e.g. GPRS) session, no IP address for the terminal will be registered within the network.

Solutions for existing services have been, in the main, tailor-made. For example, in the case of the Multimedia Messaging Service (MMS), receipt of an MMS message within a network triggers the sending of an SMS to the destination terminal so as to notify the user that he or she has a message. The SMS contains a URL link to the MMS content. By accepting the message, the user causes the terminal to establish a data session and retrieve the MMS data (this may alternatively happen without user intervention). In the case of IP Multimedia System (IMS) enabled services, a wireless terminal is required to send REGISTER messages to the IMS core at regular intervals in order to maintain the session.

A similar problem arises in the case of wired terminals, and terminals attached via an always-on wireless network (e.g. WLAN) to a fixed access point for an IP access network. For example, one might consider the case of a "regular" Ethernet connected Personal Computer (PC) which can operate in a low power mode where everything except the Ethernet card is powered down. In this mode, it is likely that no IP address will be allocated to the device by the access network and, in any case, the PC would be incapable of receiving any pushed data. Any existing solutions for waking the PC up are likely to be custom designed for specific services.

SUMMARY

According to a first aspect of the present invention there is provided a method of operating a Domain Name System server, the method comprising:

receiving a query containing as a search key a Domain Name System name of a destination terminal;

determining whether or not an IP address for the Domain Name System name is registered with the Domain Name System server;

if an IP address is registered, returning the IP address to the sender of the query; and if an IP address is not registered, causing a wake-up message to be sent to said destination terminal, receiving an IP address allocated to the destination terminal, and returning the IP address to the sender of the query.

The invention can be employed to provide a generic session establishment procedure, whereby any service can initiate, via a Domain Name System server, a data session between the network and a destination terminal, and cause delivery of the related IP address to an appropriate peer entity. As such, the destination terminal will be perceived as always on to any service that can access the Domain Name System server. Systems requiring data communication with a destination terminal and requiring to wake-up that terminal will only ever have to communicate with a single interface, namely the Domain Name System server. New services can be developed and introduced more quickly than would otherwise be possible.

According to conventional practices, the Domain Name System server may store the mapping between the Domain Name System name and the received IP address for use in responding to a subsequent query. The mapping may be stored until such time as the Domain Name System server is instructed to remove the mapping by another network entity.

Said step of receiving an IP address allocated to the destination terminal may involve the Domain Name System server receiving a pushed update from an access server responsible for the destination terminal. Alternatively, the Domain Name System server may retrieve the IP address from a Dynamic Host Control Protocol server.

Said Domain Name System name may be for example a fully qualified domain name (FQDN), e.g. "john.smith.ericsson.com", or a part of a FQDN, e.g. "john.smith". The Domain Name System name may of course be some other identifier, for example an ENUM mapping of an E.164 number, .e.g. "2.4.3.4.5.4.5.1.e164.arpa".

The invention is applicable in particular to destination terminals of the wireless type, and more particularly to wireless terminals for use with cellular mobile telephone networks. As has already been discussed, such terminals will often be in an on state, but will not have an active data session. In the case of a cellular wireless terminal, said wake-up message may be a text message, for example a Short Message Service (SMS) message.

The invention is also applicable to destination terminals having a wired connection to an IP access network (the terminal may be wired to a fixed access point, e.g. a cable or ADSL modem, or connected via a wireless network, e.g. WLAN). In this case, said wake-up message may be a "Wake-On-LAN" signal initiated by the Domain Name System server intended to wake the destination terminal from a suspended or low power mode.

According to a second aspect of the present invention there is provided a Domain Name System server comprising:
- a memory storing Domain Name System names and associated IP addresses;
- a first input for receiving a query containing as a search key a Domain Name System name of a destination terminal;
- a first processor for determining whether or not an IP address for the Domain Name System name is registered with the Domain Name System server, and, if an IP address is registered, for returning the IP address to the sender of the query, and, if an IP address is not registered, for causing a wake-up message to be sent to said destination terminal;
- a second input for receiving in response an IP address allocated to the destination terminal; and
- a second processor for returning the IP address to the sender of the query.

According to a third aspect of the present invention there is provided a method of operating a terminal comprising means for accessing a communication network, the method comprising:
- receiving a wake-up message from said network and in response establishing an IP data session with the communication network; and
- monitoring usage of the established session at the connectivity layer for the purpose of deciding whether or not the session should be terminated.

Receipt of the wake-up message at the terminal does not by itself trigger any application specific functions. For example receipt of the message does not trigger downloading of MMS data. The mechanism described here is therefore generic to all applications.

The terminal may be for example a cellular wireless terminal. In the case of a GSM or UMTS (3G) terminal, said data session may be a PDP context, in which case said connectivity layer is the PDP context layer.

According to a fourth aspect of the present invention there is provided a terminal comprising means for accessing a communication network, the terminal further comprising:
- means for receiving a wake-up message from said network and in response for establishing an IP data session with the communication network; and
- means for monitoring usage of the established session at the connectivity layer for the purpose of deciding whether or not the session should be terminated.

According to a fifth aspect of the present invention there is provided a method of establishing a data session between a communication network and a destination terminal for the purpose of pushing IP data to the destination terminal from a peer entity, the method comprising:
- sending a Domain Name System query from said peer entity to a Domain Name System server, the query containing as a search key a Domain Name System name of the destination terminal;
- determining at the Domain Name System server whether or not an IP address is registered there for said Domain Name System name;
- if an IP address is registered, sending the IP address from the Domain Name System server to said peer entity; and
- if an IP address is not registered, sending a wake-up message from the communication network to said destination terminal, upon receipt of the message at said terminal, establishing a data session between the terminal and the network including allocating an IP address to the terminal, providing the IP address to said Domain Name System server, and sending the IP address from the Domain Name System server to said peer entity.

DETAILED DESCRIPTION

Figure 1:
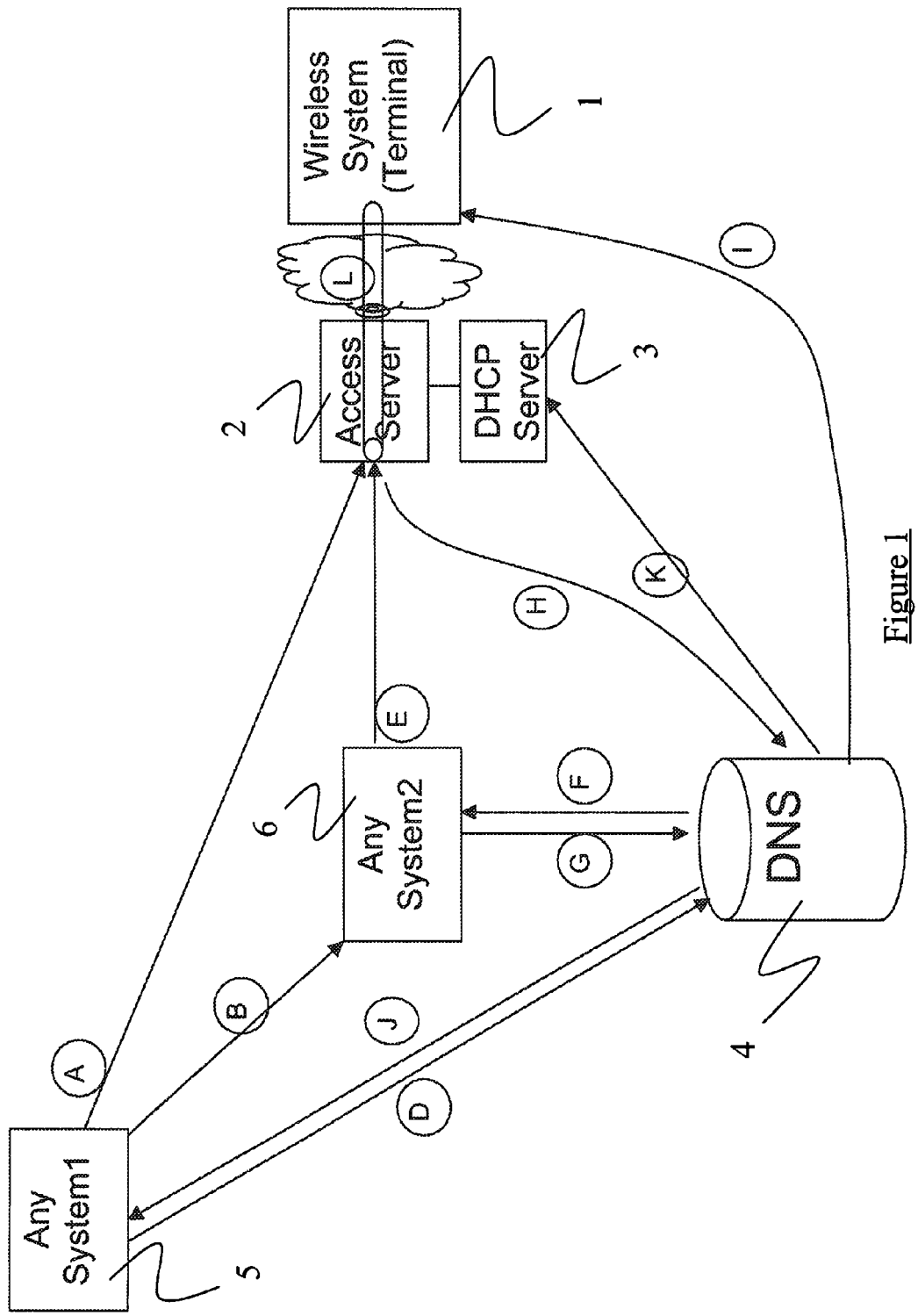
FIG. 1 illustrates schematically a system architecture for pushing IP data to a wireless terminal.

There is illustrated in FIG. 1 a typical system architecture for a communication system comprising an access network for facilitating communications to and from a wireless system (specifically a wireless terminal) 1. Only components relevant to a discussion of the inventive principle are illustrated. The access network comprises an Access Server 2 which acts as an IP gateway for the wireless terminal 1, routing IP traffic between the wireless terminal and the Internet (where the term Internet as used here encompasses both the WWW and private IP networks such as an operator's IP backbone). A role of the Access Gateway 2 is to instigate allocation, upon request, of an IP address to the wireless terminal. In the case of a General Packet Radio Service (GPRS) access network, the Access Server is a GPRS Gateway Support Node (GGSN).

A wireless terminal making use of the access network will have been allocated a Domain Name System (DNS) name. The term "DNS name" is used here in the widest sense, and is not limited to a hostnames such as "jsmith.ericsson.com". The term therefore encompasses hostnames, FQDNs, TEL URIs, SIP URIs, E.164 telephone numbers, etc. A DNS name is used by a peer terminal (which may be a wireless terminal, wired terminal, network based node, web server etc) to send IP packets to the wireless terminal that owns the name.

A Dynamic Host Control Protocol (DHCP) server 3 is also provided within the access network. Indeed, the DHCP server is typically collocated with the Access Server, although this need not be the case. One function of the DHCP server 3 is to allocate an IP address to the wireless terminal under instruction from the Access Server. The access network operator maintains a Domain Name System server 4 whose role is to maintain mappings between domain names (that are "owned" by the access network operator) and IP addresses.

FIG. 1 illustrates two "systems" identified as "Any System1" 5 and "Any System2" 6. These systems are representative of any system which may access the DNS server 4 to obtain an IP address corresponding to a DNS name. In the case where Any System1 wants to send IP data to Any System2, the classical approach involves:
- System1 executes a DNS lookup on System2's name (D)
- The DNS server responds with System2's IP Address (J)
- System1 connects to System2's IP address (B) and proceeds with its normal protocol execution.

In the case where Any System1 wants to push data to a wireless terminal, the following approach is used:
- System1 executes a DNS lookup using the wireless terminal's name as query key (D)
- If no IP address is currently registered for the query key, i.e. the wireless terminal is NOT online, the DNS server sends an SMS message (of the OMA push type) to the wireless system (possibly via an SMS messaging centre and a Push Proxy Gateway although such a signalling route is not desirable due to the added latency), requesting that it start its dial-up procedures (I). Upon receipt of the SMS message, an appropriate application at the terminal automatically causes the terminal to establish a data session (e.g. PDP context in the case of GPRS) with the Access Server. The Access Server allocates an IP address to the terminal.

It is then necessary to deliver the IP address to the DNS server. This can be achieved in a number of ways. Three possibilities are:

1. The access network registers the IP address in the DNS server using dynamic DNS procedures (H), i.e. IETF rfc2136, Dynamic Updates in the Domain Name System (DNS UPDATE); or
2. Rather than use the DDNS procedure, a RADIUS ACCOUNTING START message is sent to the DNS server; or
3. The DNS server retrieves this information (K) from the DHCP server used to allocate the IP address for the dial-up connection (L); or The DNS server responds to the querying entity, namely Any System1, with the wireless terminal's IP address (J)

Any System1 begins sending IP packets to the wireless terminals IP address (A) [after any required negotiation phase is completed]. It will be appreciated that Any System1 does not need to know the nature of the recipient terminal, i.e. that it is a wireless terminal.

Figure 2:
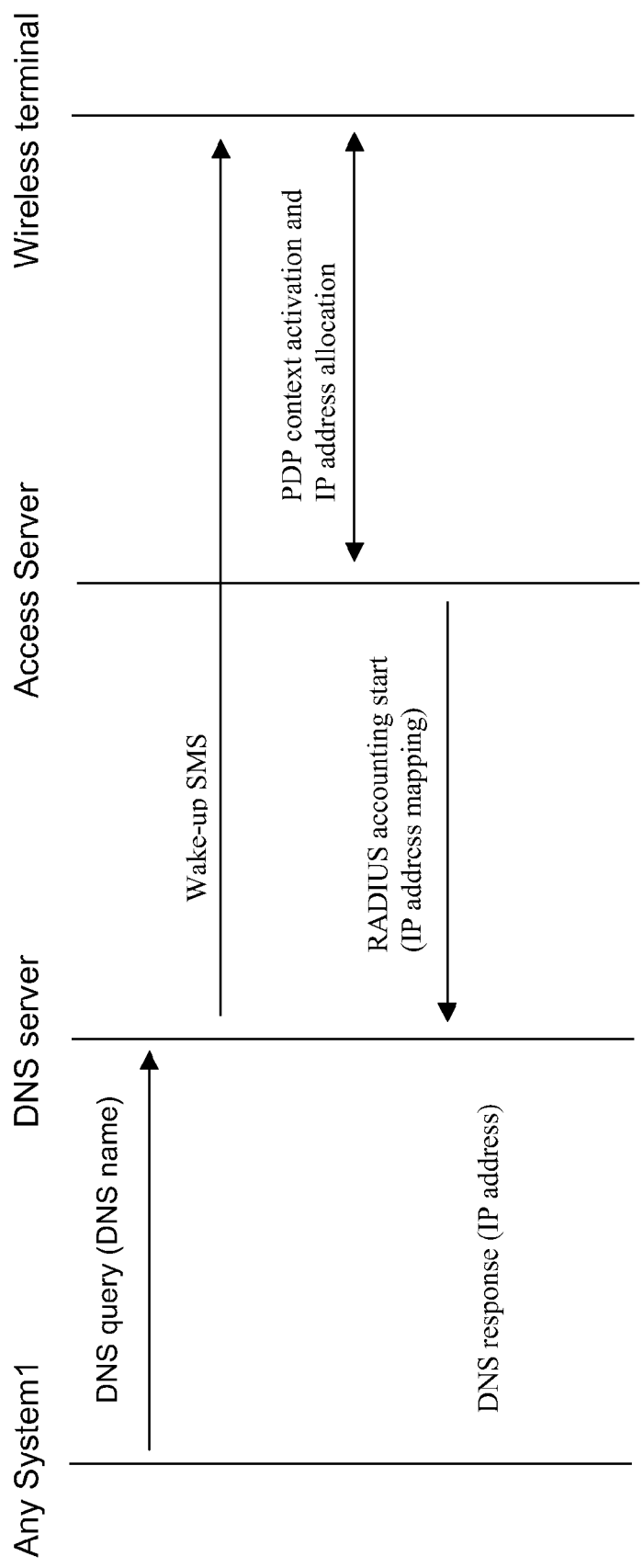
FIG. 2 illustrates the signalling flow between various entities associated with a DNS query within the system of FIG. 1.
Figure 3:
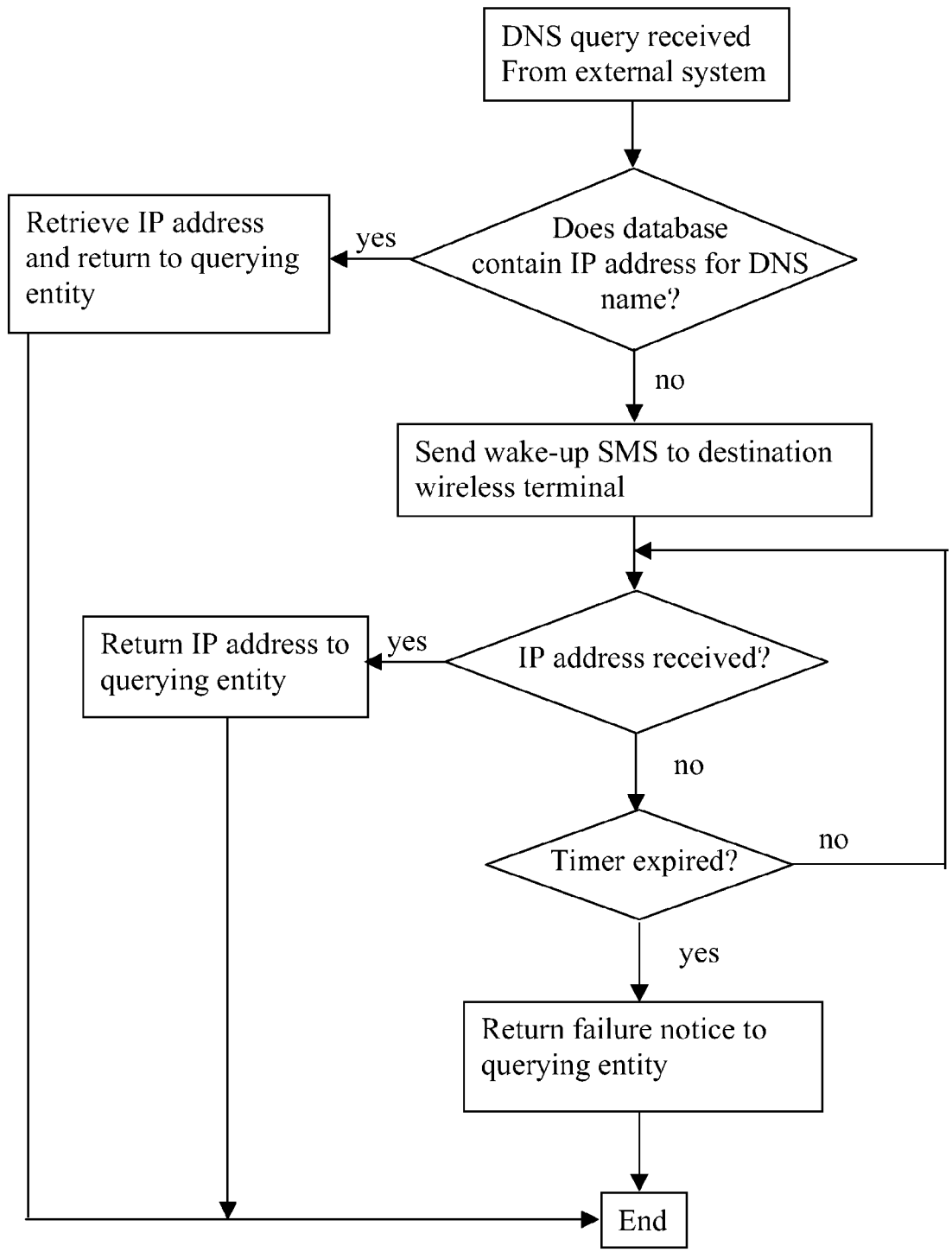
FIG. 3 is a flow diagram illustrating a process flow within DNS server of FIG. 1.

FIG. 2 illustrates the signalling flow between the various entities of FIG. 1 in the case where the Access Server registers the IP address of the wireless terminal in the DNS server. FIG. 3 is a flow diagram illustrating the process running within the DNS server. The process is exactly the same for any other system accessing the wireless terminal (as depicted with steps G, F and E for Any System2).

Figure 4:
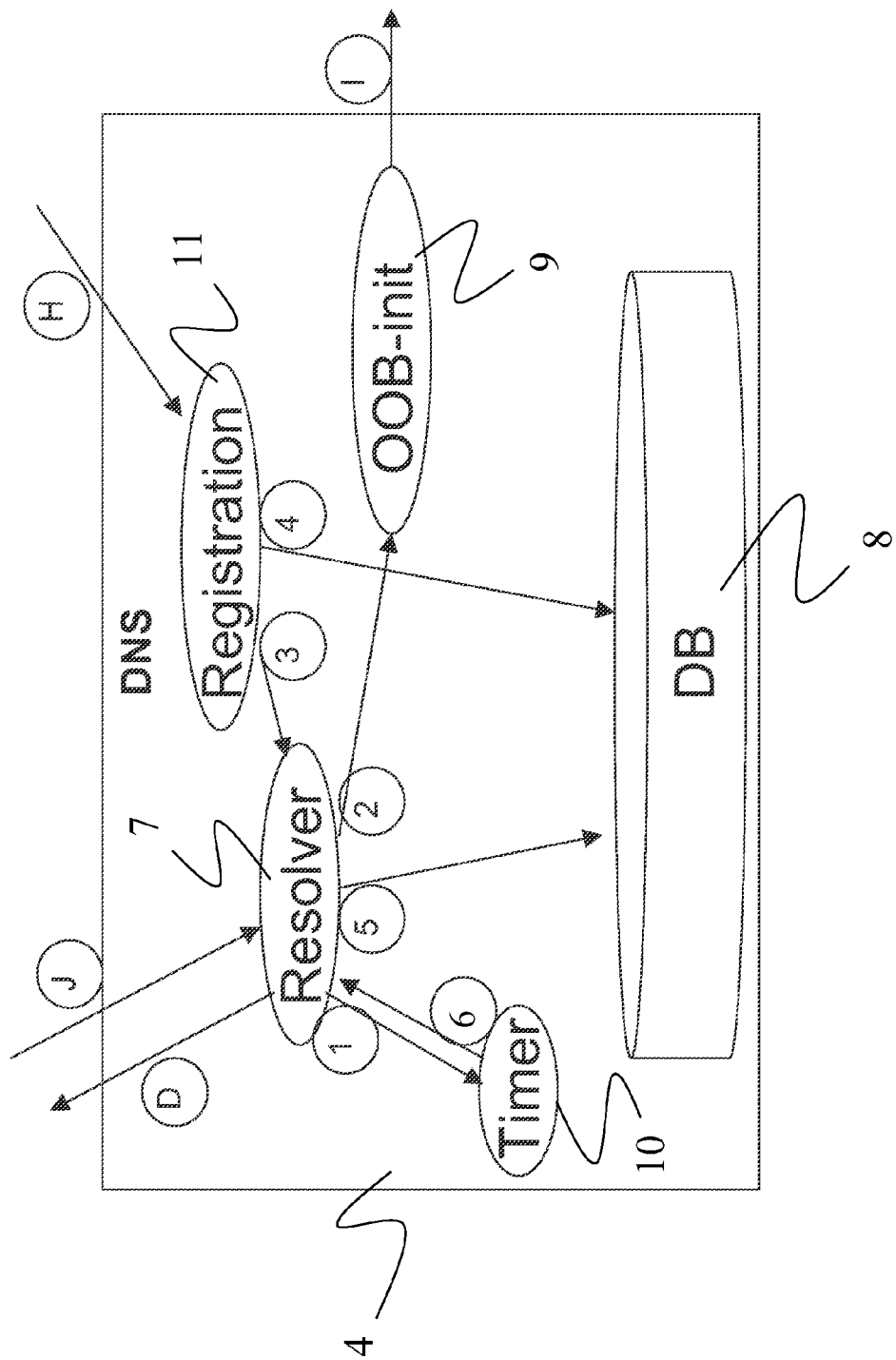
FIG. 4 illustrates schematically functional components of a DNS server of the system of FIG. 1.

FIG. 4 illustrates various functional entities within the DNS server. These are best considered in the context of the IP address look-up process. Upon reception of a lookup request (J), a Resolver 7 checks its associated database 8 (step 5) for an existing entry (an A record (for IPv4) or a AAAA record (for IPv6)). If none is found, an Out-Of-Band signal initiating entity 9 initiates a signalling procedure (step 2), causing external signalling (I) (e.g. sending of an SMS) to occur. [This signal is referred to as an Out-Of-Band signal as is sent via a link which is not the link used to subsequently carry the data]. The signalling possibly carries details of the desired qualities of the connection to be established. At the same time, a timer 10 is started (step 1). An external signal (H) arrives at the registration unit 11 before the timer expires (e.g. using the Remote Authentication Dial In User Service (RADIUS) protocol, "accounting start" message). The database is updated with a new IP address for the wireless terminal (step 4) and the resolver notified (step 3). The resolver 7 fetches the new record (step 5), cancels the timer, and responds to the querying entry (D). If on the other hand the timer expires before any external signal arrives, the resolver responds (D) to the querying entity indicating that no A/AAAA record exists. [Of course, if an external signal H arrives after the expiry of the timer, the database will still be updated with the new IP address mapping, only this will be too late to respond to the original enquiring entity.]

Figure 5:
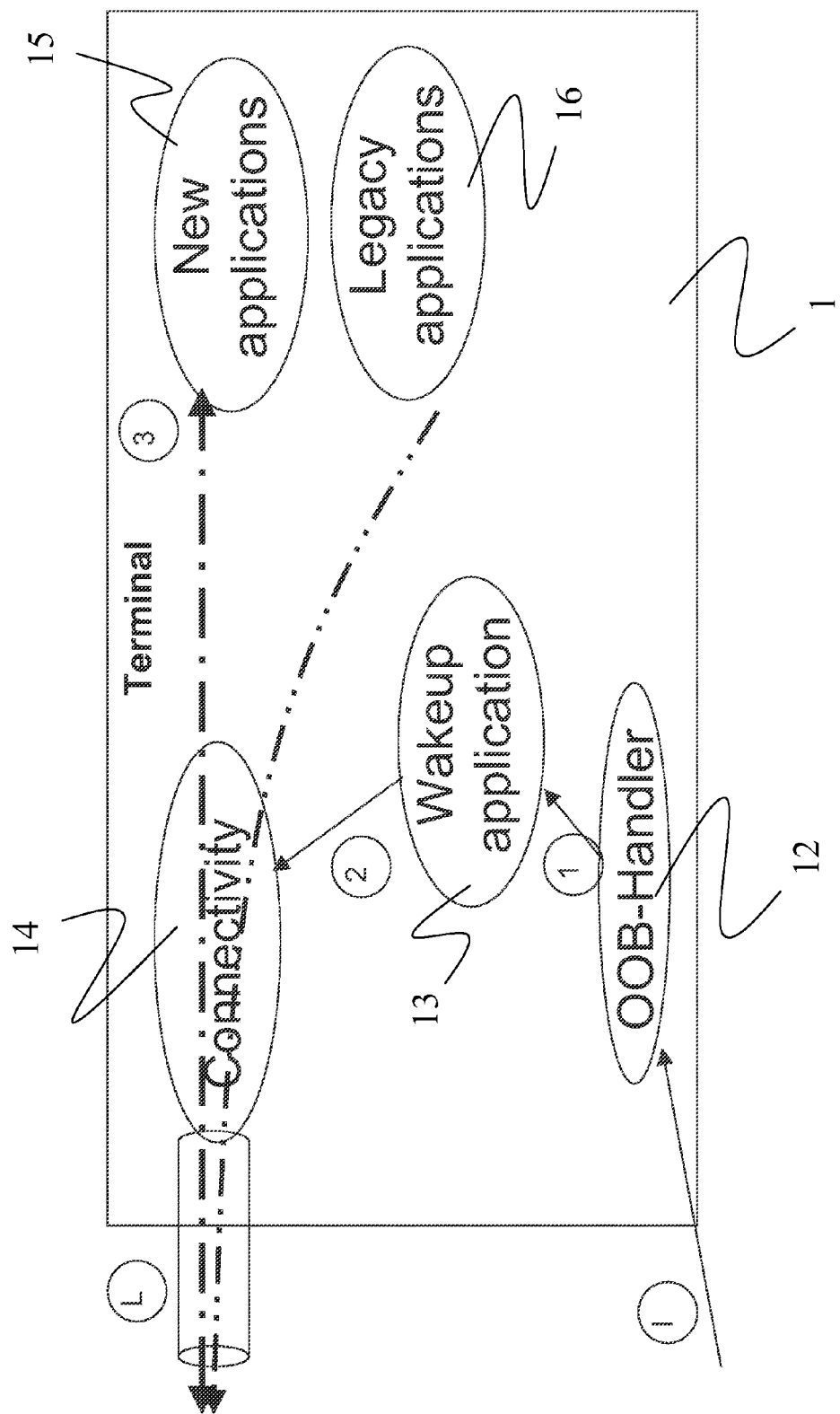
FIG. 5 illustrates schematically functional components of a wireless terminal of the system of FIG. 1.

FIG. 5 illustrates various functional entities of the wireless terminal which again are best illustrated in the context of the process. Upon reception of the out-of-band signal (I), an out-of-band Handler 12 dispatches the signal to a wakeup application 13 (step 1). The wakeup application 13 contacts a connectivity manager 14 (step 2) and asks it to establish a data session (L), possibly using any quality parameters received in the out-of-band signal. Once the connection is established, new applications 15 can be reached from the network (step 3) and vice versa. Legacy applications 16 such as MMS can be reached in the same way or via existing mechanisms.

It will be appreciated by the person of skill in the art that various modifications may be made to the above described embodiments without departing from the scope of the present invention. One might consider in particular the case of a Personal Computer (PC) which is connected to an access network via a fixed line. The PC may communicate with the fixed line via a further fixed line, e.g. a line connecting the PC to a cable modem, or via a WLAN. In this case, the out-of-band signalling may be a "wake-on-LAN" signal which enables the Ethernet connected PC to be woken from a low power mode in which only the Ethernet card is powered up.

The invention claimed is:

1. A method of operating a Domain Name System server, the method comprising the steps of:
    receiving a query containing as a search key, a Domain Name System name of a destination terminal for which a Session Initiation Protocol (SIP) address is not assigned;
    determining whether an Internet Protocol (IP) address for the Domain Name System name is registered with the Domain Name System server;
    upon determining that an IP address is registered, returning the registered IP address to a sender of the query; and
    upon determining that an IP address is not registered:
    determining that the destination terminal is offline;
    in response to receiving the query and determining that the destination terminal is offline, triggering a wake-up message to be sent to the offline destination terminal via an out-of-band signaling link different than a communication link subsequently utilized to carry data, wherein the wake-up message is sent without any prior application level protocol exchange with the offline destination terminal, and the wake-up message causes the destination terminal to go online and establish a data session;
    retrieving an IP address allocated to the destination terminal as a result of establishing the data session, wherein the Domain Name System server retrieves the IP address from a Dynamic Host Control Protocol Server; and
    returning the received IP address to the sender of the query;
    wherein the method saves network resources by allowing the destination terminal to remain offline until the triggered wake-up message causes the offline destination terminal to go online and establish the data session.

2. The method according to claim 1, wherein said Domain Name System name is one of a Fully Qualified Domain Name, a part of a Fully Qualified Domain Name, and an ENUM mapping of an E.164 number.

3. The method according to claim 1, wherein said destination terminal is a wireless terminal.

4. The method according to claim 3, wherein said wake-up message is a Short Message Service message.

5. The method according to claim 1, wherein said wake-up message is a "Wake-On-LAN" signal for waking the destination terminal from a suspended or low power mode.

6. A Domain Name System server comprising:
    a memory for storing Domain Name System names and associated IP addresses;
    a first input for receiving a query containing as a search key, a Domain Name System name of a destination terminal for which a Session Initiation Protocol (SIP) address is not assigned;

a first processor for determining whether an Internet Protocol (IP) address for the Domain Name System name is registered with the Domain Name System server, and, when an IP address is registered, for returning the registered IP address to a sender of the query, and, when an IP address is not registered, for determining that the destination terminal is offline, and in response, triggering a wake-up message to be sent to the offline destination terminal;

a first output for sending the wake-up message to the offline destination terminal via an out-of-band signaling link different than a communication link subsequently utilized to carry data, wherein the wake-up message is sent without any prior application level protocol exchange with the offline destination terminal, and the wake-up message causes the destination terminal to go online and establish a data session;

a second input for receiving in response to the wake-up message, an IP address allocated to the destination terminal as a result of establishing the data session, wherein the Domain Name System server retrieves the IP address from a Dynamic Host Control Protocol server; and a second output for returning the received IP address to the sender of the query;

wherein network resources are saved by allowing the destination terminal to remain offline until the triggered wake-up message causes the offline destination terminal to go online and establish the data session.

7. A method of operating a communication terminal for which a Session Initiation Protocol (SIP) address is not assigned, the communication terminal having means for accessing a communication network, the communication terminal initially operating in a suspended or low power mode, the method being generic to all applications and comprising the steps of:

receiving a wake-up message from a Domain Name System server in the communication network via an out-of-band signaling link different than a communication link subsequently utilized to carry data;

in response to receiving the wake-up message, switching to an active or high power mode and establishing an Internet Protocol (IP) data session with an access server in the communication network that allocates to the communication terminal, an IP address retrieved from a Dynamic Host Control Protocol server, wherein receipt of the wake-up message does not trigger any application-specific functions in the communication terminal; and monitoring usage of the established session at a connectivity layer for deciding whether the session should be terminated;

wherein the method saves network resources by allowing the communication terminal to remain in the suspended or low power mode until the wake-up message causes the communication terminal to establish the data session.

8. The method according to claim 7, wherein the communication terminal is a cellular wireless terminal.

9. The method according to claim 8, wherein said communication terminal is a GSM or 3G terminal, and said data session is a PDP context, in which case said connectivity layer is the PDP context layer.

10. The method according to claim 8, wherein said wake-up message is a Short Messaging Service message.

11. A method of establishing a data session between a communication network and a destination terminal for the purpose of pushing Internet Protocol (IP) data to the destination terminal from a peer entity, wherein the destination terminal does not have a Session Initiation Protocol (SIP) address assigned, the method being generic to all applications and comprising:

sending a Domain Name System query from said peer entity to a Domain Name System server, the query containing as a search key, a Domain Name System name of the destination terminal;

determining at the Domain Name System server whether an IP address is registered there for said Domain Name System name;

upon determining that an IP address is registered, sending the registered IP address from the Domain Name System server to said peer entity; and upon determining that an IP address is not registered, determining that the destination terminal is offline, and in response, sending a wake-up message from the Domain Name System server to the offline destination terminal via an out-of-band signaling link different than a communication link subsequently utilized to carry data;

upon receipt of the message at the offline destination terminal, establishing a data session between the destination terminal and the communication network including allocating an IP address to the destination terminal at an access server and a Dynamic Host Control Protocol server without triggering any application-specific functions in the destination terminal;

retrieving the allocated IP address by the Domain Name System server from the Dynamic Host Control Protocol server; and sending the allocated IP address from the Domain Name System server to said peer entity, wherein the method saves network resources by allowing the destination terminal to remain offline until the wake-up message causes the communication terminal to establish the data session.

12. A communication terminal for which a Session Initiation Protocol (SIP) address is not assigned, the communication terminal comprising:

means for selectively operating in a suspended, low power mode or in an active, high power mode;

means for receiving a wake-up message from a Domain Name System server in a communication network via an out-of-band signaling link different than a communication link subsequently utilized to carry data;

a wake-up controller for switching to the active, high power mode in response to receiving the wake-up message;

a connectivity controller for establishing an IP data session with the access server in the communication network without triggering any application-specific functions in the communication terminal, wherein the Domain Name System server retrieves an IP address for the communication terminal from a Dynamic Host Control Protocol server; and a monitor for monitoring usage of the established session at a connectivity layer for deciding whether the session should be terminated;

wherein terminal and network resources are saved by allowing the communication terminal to remain in the suspended, low power mode until the wake-up message causes the communication terminal to switch to the active, high power mode and establish the data session.

* * * * *

UNITED STATES PATENT AND TRADEMARK OFFICE
CERTIFICATE OF CORRECTION

PATENT NO.        : 8,346,850 B2                                        Page 1 of 1
APPLICATION NO.   : 12/519550
DATED             : January 1, 2013
INVENTOR(S)       : Eriksson It is certified that error appears in the above-identified patent and that said Letters Patent is hereby corrected as shown below:

In Column 4, Lines 48-50, delete "Name System...........addresses." and insert the same on Line 47, after "Domain", as a continuation.

Signed and Sealed this
Ninth Day of April, 2013

Teresa Stanek Rea
*Acting Director of the United States Patent and Trademark Office*